Aug. 4, 1970　　　A. DYBVIG ET AL　　　3,522,518
CONTROL SYSTEM FOR ANTIPARALLEL-CONNECTED CONVERTERS
Filed Oct. 4, 1967　　　　　　　　　　　　　　　2 Sheets-Sheet 1

INVENTOR.
ARNE DYBVIG, BENGT SJÖNNER
VILMOS TOROK, PER RAIN
Jennings Bailey, Jr.

United States Patent Office 3,522,518
Patented Aug. 4, 1970

---

3,522,518
CONTROL SYSTEM FOR ANTIPARALLEL-CONNECTED CONVERTERS
Arne Dybvig, Bengt Sinner, Vilmos Török, and Per Kain, Vasteras, Sweden, assignors to Allmanna Svenska Elektriska Aktiebolaget, Vasteras, Sweden, a Swedish corporation
Filed Oct. 4, 1967, Ser. No. 672,826
Claims priority, application Sweden, Oct. 6, 1966, 13,473/66
Int. Cl. H02m 1/08, 7/08
U.S. Cl. 321—18                     12 Claims

ABSTRACT OF THE DISCLOSURE

A control system for antiparallel-connected converters connected to a load; means is provided to control the output voltage of the converters; the value of the direct current is measured and controls pulse devices for the converters; the pulses are compared with a reference pulse; blocking means are provided which block the pulses to one of the converters at all times and also block the pulses to a converter when the length of the current pulses fed to such converter decreases below the length of the reference pulse.

BACKGROUND OF THE INVENTION

Field of the invention

The present invention relates to a control system for a converter plant comprising two controlled converters with control pulse devices, the DC outputs of the converters being antiparallel-connected and connected to a load to feed it, a voltage-controlling means being arranged to control the direct voltage output of the converters, current sensing means being arranged to measure the instantaneous value of the direct current through each converter and blocking means being arranged to always block the control pulses to at least one of the converters so that only one converter at a time can be conducting (unblocked).

The prior art

Converters in antiparallel-connection are suitable, for example for reversible operation of DC motors. In a known system both the converters are unblocked simultaneously. In order to prevent currents circulating which only pass the converters and not the load, it is necessary to connect so-called circulating current reactors in series with the converters. These reactors are, however, expensive and space-consuming. The circulating currents can in known manner be eliminated by means of so-called circulating-current-free antiparallel connections which means that only one converter at a time is conducting (unblocked), while the other is blocked. The reactors are then unnecessary and may be omitted, which means considerable economic saving and saving in space. In a known system of this type the blocked converter is controlled to full inverter operation. This means that when this converter is to take over the load current it is normally not controlled to the desired voltage immediately after unblocking. Thus a certain time passes, which of course can be rather short, but which is a serious disadvantage when a rapid control system is required.

SUMMARY OF THE INVENTION

The invention of the present invention is to effect a means with the help of which the above-mentioned disadvantages are eliminated. The invention is characterised in that comparing means are arranged to compare the length of the DC pulses of each converter with the length of a reference pulse and that, if the length of the current pulses of a conducting converter decreases below the length of the reference pulse, the comparing means are arranged to influence the blocking means so that the pulses to this converter are blocked. A suitable choice of the relation between the delay angles and the length of the reference pulse, when one converter is blocked and the other unblocked, causes the voltage across the motor immediately to reach the correct value and no time is wasted on correction of possible voltage errors.

After blocking of the previously conducting converter the other converter must be unblocked as soon as possible. Iit is important that this does not take place before the first-mentioned converter really has been blocked as otherwise a fuse will be blown due to the overloading. According to a further development of the invention time-delay circuits are arranged to influence the blocking means so that the one converter can only be unblocked after a certain time-interval has passed since blocking of the other converter and then only if the current through the blocked converter is still zero. In this way it is guaranteed that no break in operation will occur due to temporary faulty operation of the control pulse devices. By a suitable choice of this time-interval any desired compromise between safety in operation and speed can be obtained and the increased speed of control obtained by means of the invention can be utilized to the full.

When a converter is unblocked it is a short while before the current through it has reached the value corresponding to its delay angle. Thus, if the converter is unblocked at such a moment during the interval between two commutations that current is immediately obtained, the first current pulse will not correspond to the actual delay angle. It may thus happen that the length of this current pulse is less than the length of the above-mentioned reference pulse and that the converter is thus blocked. In order to avoid this, accordingf to a further development of the invention the control pulse device of the converters is arranged to influence the blocked member so that the conducting converter cannot be blocked until at least one commutation has taken place after the converter has been unblocked.

When the current reference to the control system of the converters is set at a value lower than the reference which in a converter emits current pulses all of which are longer than the reference pulse, the blocking system will oscillate with a certain frequency and the converters be alternately connected to the load. The current through load will in this case be an alternating current with a DC component equal to the desired value of the load current indicated through the current reference. This oscillation of the blocking system does not initiate itself when the converter plant is set in operation and it is therefore suitable to provide the blocking system with a starting means arranged, when the plant is started, to automatically unblock one of the converters but afterwards not to interfere with the operation of the system.

BRIEF DESCRIPTION OF THE DRAWINGS

The invention will be described more fully with reference to the accompanying figures where.

DESCRIPTION OF THE PREFERRED EMBODIMENTS

Figure 1:
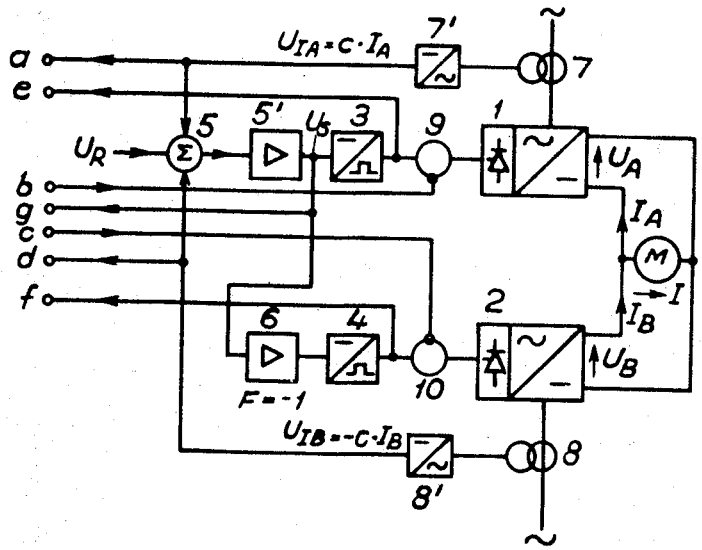
FIGS. 1 and 1a show a connection diagram for a converter plant according to the invention.
Figure 1A:
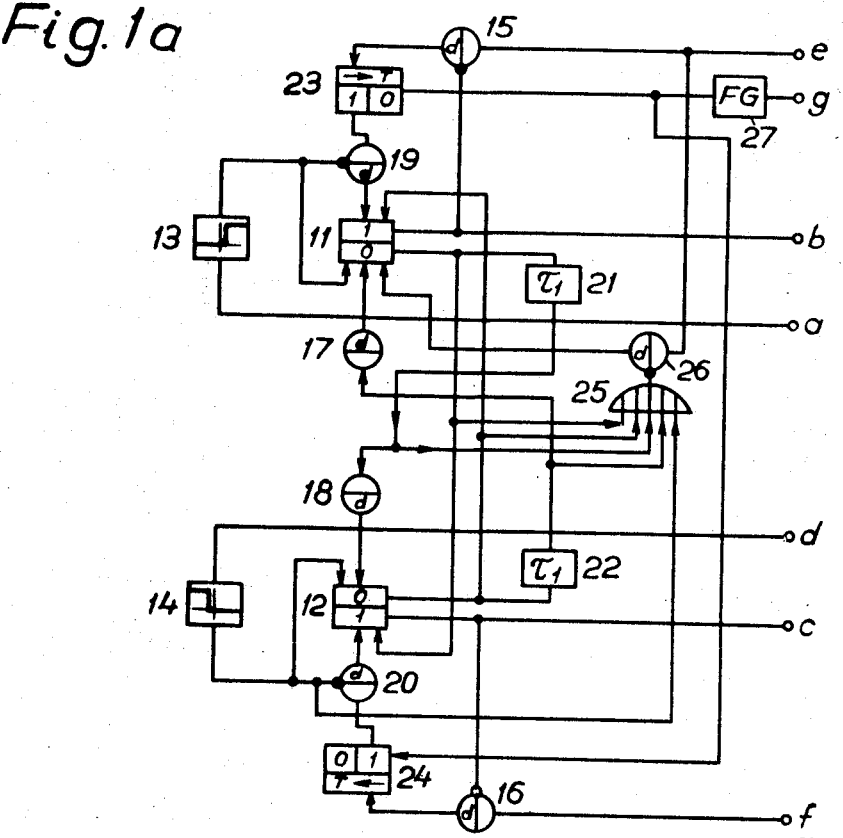
Figure 2:
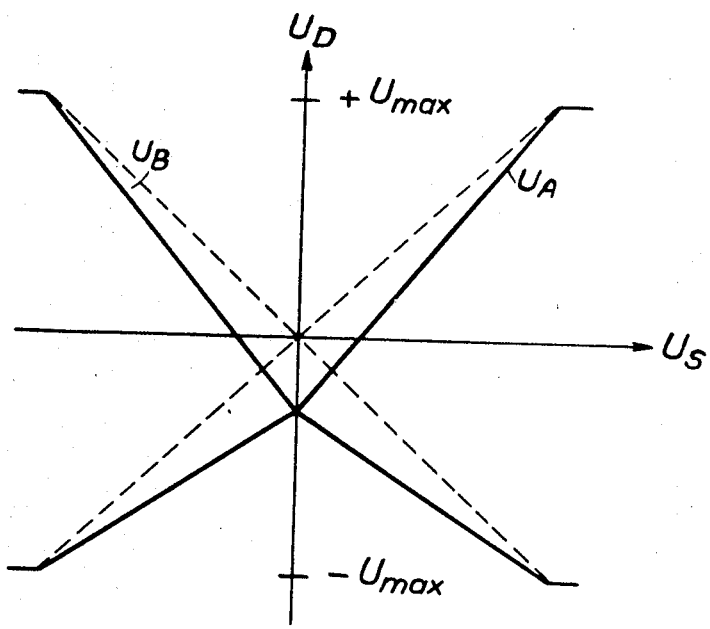
FIG. 2 shows the direct voltage of the converters in the plant as a function of the control voltage to the control pulse device of the converters.

In FIGS. 1 and 1a the load of the converter plant consists of the motor M which is connected to the anti-parallel-connected converters 1 and 2. The AC terminals of these converters are connected to a feeding AC network by the current transformers 7 and 8. The positive reference directions of the direct voltage and direct current ($U_A$, $U_B$ and $I_A$, $I_B$, respectively) of the converters and of the load current I are indicated in the figures. The secondary currents of the current transformers are rectified in the measuring rectifiers 7' and 8' and converted to direct voltages. On the output side of the rectifier 7' a voltage $U_{IA}$ is obtained proportional to the direct current $I_A$ of the converter 1 and on the output side of the rectifier 8' a voltage $U_{IB}$ proportional to the direct current $I_B$ of the converter 2, but with reversed sign. Th voltages $U_{IA}$ and $U_{IB}$, one of which is always zero since at all times only one converter is unblocked, provided the actual value of the load current and are compared in the summation circuit 5 with a voltage $U_R$ which corresponds to the desired value of the current and thus provides the current reference. This can be obtained from a control system, not shown, be manually adjusted or obtained in some other way. The output voltage from the circuit 5 which thus forms the control error, the difference between the actual and desired value of the current, is amplified in the control amplifier 5' and supplied directly to the control pulse device 3 of the converter 1 and also through the sign-reverser 6 to the control pulse device 4 of the converter 2. The control pulse devices are arranged in a manner known per se to generate control pulses to the rectifiers in the converters, which control pulses have a time position in relation to the alternating voltage feeding the converters which is dependent on the signal $U_S$ obtained from the amplifier 5'. The direct voltage of the converters (with continuous current) as a function of $U_S$ is shown in FIG. 2. Upon a changeover from one converter to the other it is desired that the previously blocked converter shall be controlled to deliver the same voltage to the load as the conducting converter has been delivering up to that time. If the current is continuous and if the inner voltage drop of the converters is disregarded, this would be the case if $U_A = -U_B$ which is most easily achieved if the control curves are the two dotted straight lines intersecting each other at the origin of coordinates as shown in FIG. 2. With interrupted current, however, the direct voltage of the converter operating as rectifier will be higher and of the converter operating as inverter lower than is shown by the dotted lines. At switching, therefore, there would be a difference between the voltages and this difference would be greatest when the direct voltage is zero and decrease with increasing voltage. By giving the control curves the form shown by unbroken lines in FIG. 2, this difference is decreased. At full direct voltage, the control curves (unbroken) intersect the dotted ones which means that the entire voltage capability of the converters can be utilized. With the dotted control curves the sum of the delay angles of the converters is always 180°. With the unbroken ones, on the other hand, the sum is always (except at full voltage) greater than 180°. Thus the sum of the voltages of the converters will be less than zero. The sum is most negative when $U_S = 0$ and increases with increased voltage substantially linearly with $U_S$ to the value zero at full control.

At full direct voltage and continuous current $U_A = -U_B$ in the control curves shown and thus at higher voltages and with an interrupted current a difference arises between the voltages of the rectifiers and the inverters. This difference decreases with increased length of the current pulses and can therefore be compensated by making the length of the reference pulse greater at higher voltages that at lower voltages. The operating generator 27 in FIG. 1a is arranged to change the pulse length of the 1-pulses of the mono-stable flip-flops 23 and 24 in dependence on $U_S$, so that the length is least when $U_S = 0$ and increases with increasing control, for example from 1.5 ms. to about 3 ms.

Electronic contacts 9 and 10, known per se, are connected between the control pulse devices and the converters. The control pulses from the control pulse device 3 are allowed to reach the rectifiers of the converter 1 if the flip-flop 11, from which the contact 9 is controlled, is in zero-position (the converter is unblocked), and are not allowed through when the flip-flop is in 1-position (the converter is blocked). The same is true for the converter 2, contact 10 and flip-flop 12. The blocking system itself is built up around the bi-stable flip-flops 11 and 12, of known logical circuit elements. When a flip-flop is in 1-position the corresponding converter is blocked and when the flip-flop is in 0-position it is unblocked. The system is arranged so that both the flip-flops cannot be in 0-position simultaneously.

To illustrate how the system operates it should be assumed first that the current reference $U_R$ is positive and greater than the limit value which gives current pulses of the same length as the reference pulses. The flip-flop 12 is in 0-position, the flip-flop 11 in 1-position, the converter 2 is unblocked and feeds the load and the converter 1 is blocked. 23 and 24 are mono-stable flip-flops which can be triggered by the control pulses through the deriving units 15 and 16. These units can be blocked by the output signals from the outputs of the flip-flops 11 and 12, respectively. The pulse length T from the flip-flops 23 and 24 can be varied through the function generator 27 by the control voltage $U_S$. The current sensing operating unit 13 is arranged to deliver an output signal if its input signal $U_{IA} = C \cdot I_A$ from the measuring rectifier 7' is greater than a certain positive threshold value near zero. The 0-output of the flip-flop is connected through the time-delay circuit 21 and the deriving circuit 18 to the 0-input of the flip-flop 12. The 0-output of the flip-flop 12 is connected to the 0-input of the flip-flop 11 through the delay circuit 22 and the deriving circiut 17.

All deriving units deliver an output pulse when the input signal changes from 1 to 0.

According to this assumption the flip-flop 11 is in 1-position and thus blocks 15. No pulses can therefore be generated in 23. The flip-flop 12 is in its 0-position and the deriving circuit 16 is therefore open. The control pulses from 4 thus trigger pulses from 24 having a pulse length T dependent on $U_S$. These pulses are initiated at each commutation in the converter 2. The pulses from 14 are simultaneous with the current pulses from the measuring rectifier 8' and are almost the same length as said current pulses. They also start upon a commutation in the converter 2. The pulse length of the output signal from 11 is compared in the deriving circuit 20 with the length T ($U_S$) of the reference pulse in such a way that the flip-flop 12 remains in the position 0 if pulses from 14 (current pulse) are longer than the pulse from 24, while the flip-flop 12 goes to the 1-position and the converter 2 becomes blocked if the same pulse length is shorter than the reference pulse from the flip-flop 24.

Accordnig to the presumption all the pulses from 14 are longer than the reference pulse and 12 therefore cannot be 1-adjusted. The system thus remains in the described positions.

Figure 3:
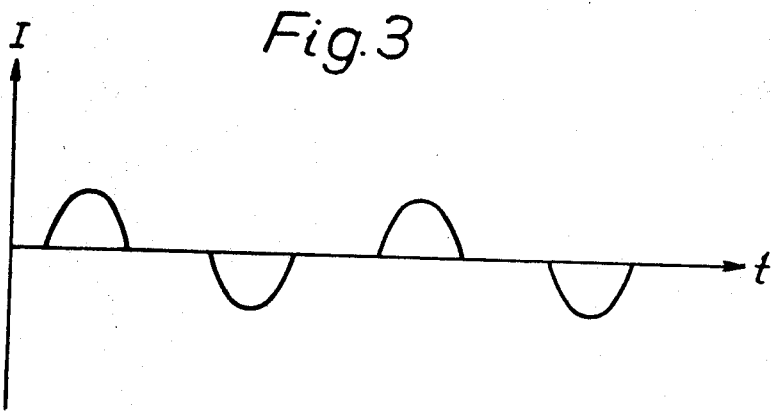
FIG. 3 shows the load currents as a function of the time when the reference value of the current is less than the reference which in a converter gives current pulses all of which are longer than the reference pulse.

If now the current reference is decreased, for example to zero, the current pulses will be shorter than the reference pulse. When this occurs the flip-flop 12 is 1-adusted through the deriving circuit 20. This causes the input signal to the delay circuit 22 to disappear. The time delay $\tau$ of this circuit is chosen, for example the same as the time between two commutations, that is for a 50 cycles per second 6 pulse converter, about 3.5 ms. After this time the flip-flop 11 is adjusted at zero and the converter 1 unblocked if the current in the converter 2 has not returned within this interval. If the current in the converter 2 returns, the flip-flop 12 is adjusted to zero and the converter 1 is never unblocked. The larger the time-delay is, the greater will be the certainty that both converters will not be unblocked simultaneously, at the cost of control speed. If the current reference is still zero the current pulses in the converter 1 will also become shorter than the reference pulse and the flip-flop 11 will be 1-adjusted by the back edge of the reference pulse and the converter 1 will be blocked. After this time the converter 2 is unblocked. The result is that, as long as the absolute value of the current reference is so low that no current pulse is shorter than the reference pulse, the blocking system will oscillate and switch in the converters alternately. This takes place in such a way that the average value of the load current corresponds to the current reference. The load current receives, for example, the appearance shown in FIG. 3 where the current reference has the value zero.

In order to start the system when the converter plant is connected, there is the starting means consisting of the OR-gate 25 and the deriving circuit 26. The control pulse device 3 is arranged to adjust the flip-flop device 11 to zero through the deriving circuit 26. The deriving circuit, however, blocks the control pulses as soon as there is a signal from one of the inputs to the gate 25. The conditions for the control pulses to be able to 0-adjust the flip-flop device 11 are, as is clear from FIG. 1, that both the flip-flop devices 11 and 12 are in 1-position, that the output signals from the delay circuits 21 and 22 are zero and that the current of the converter 2 is zero. These conditions are only fulfilled when the equipment is started and therefore the first control pulse after switching in of the feeding voltage will adjust the flip-flop device 11 to zero and thus start the system. The following control pulses will be blocked by the deriving circuit 26.

In certain cases it may be advantageous to be able to block both the converters simultaneously. This can be done, for example, by arranging an outer signal to influence blocking circuits to prevent the flip-flop devices 11 and 12 from being zero-adjusted and/or directly set the flip-flop devices in 1-position.

The shown embodiment of the invention is only an example intended to show the principle of operation of the device. A considerable number of other embodiments are feasible within the scope of the invention.

We claim:
1. Control system for a converter plant comprising two controlled converters with control pulse devices, the DC outputs of the converters being antiparallel-connected and connected to a load to feed the load, a voltage-controlling means for controlling the direct voltage output of the converters, current sensing means for measuring the instantaneous value of the direct current through each converter connected to the control pulse devices and blocking means always blocking the control pulses to at least one of the converters so that only one converter at a time can be conducting, characterized in that it includes means to supply a reference pulse and comparing means for comparing the length of the DC pulses of each converter with the length of such reference pulse and that the comparing means includes means responsive to the decrease of the length of the current pulses of a conducting converter below the length of the reference pulse to influence the blocking means so that the pulses to this converter are blocked.

2. Control system according to claim 1, characterized in that the control pulse devices of the converters include means to influence the blocking means so that blocking of the conducting converter cannot take place until at least one commutation has taken place after the converter is unblocked.

3. Control system according to claim 1, characterized in that the blocking means include means operable after blocking the conducting converter to unblock the other converter.

4. Control system according to claim 3, characterized in that the blocking means include time-delay means to prevent the other converter from being unblocked until a certain time interval has passed since blocking of the conducting converter.

5. Control system according to claim 3, characterized in that the current sensing means include means to influence the blocking means to prevent unblocking of the other converter if the current through the first converter is higher than a threshold value.

6. Control system according to claim 5, characterized in that the threshold value is substantially equal to zero.

7. Control system according to claim 1, characterized by a starting means operable when the converter station is connected to the AC network, to unblock one of the converters, such starting means being thereafter inoperable in the function of the control system.

8. Control system according to claim 7, characterized in that the blocking means and the starting means comprise logical circuits.

9. Control system according to claim 1, characterized in that the blocking means include means responsive to a signal from an outer signal source for simultaneously blocking both converters.

10. Control system according to claim 1, characterized in that the voltage controlling means includes means to influence the control pulse device of the converters in such a way that the sum of the direct voltages of the converters is at all times negative, that the absolute value of said sum is greatest when the delay angles of the converter are equal, that the absolute value of the sum decreases with increasing output voltage and that it is substantially equal to zero when the output voltages of the converters have their maximum values.

11. Control system according to claim 1, characterized in that the voltage controlling means includes means influence the comparison means so that the length of the reference pulses becomes a function of the output voltages of the converters.

12. Control system according to claim 11, characterized in that the length of the reference pulse is greatest when one of the converters is controlled (with respect to the commutation margin) to full inverter operation and least when the control angles of the converters are equal.

References Cited
UNITED STATES PATENTS

| | | | |
|---|---|---|---|
| 3,293,448 | 12/1966 | Amato. | |
| 3,320,514 | 5/1967 | Lawrence | 321—45 |
| 3,320,515 | 5/1967 | Amato et al. | 321—45 |
| 3,341,765 | 9/1967 | Rogers et al. | 321—45 X |
| 3,413,539 | 11/1968 | Lopitzsch | 321—45 |
| 3,364,413 | 1/1968 | Abraham | 321—18 |
| 3,423,665 | 1/1969 | Greenberg et al. | 321—18 X |

LEE T. HIX, Primary Examiner

G. GOLDBERG, Assistant Examiner

U.S. Cl. X.R.
307—234, 242, 265; 321—43; 323—24